(12) United States Patent
Lin

(10) Patent No.: US 9,848,654 B2
(45) Date of Patent: Dec. 26, 2017

(54) ELECTRONIC CIGARETTE WITH OVAL SHAPED CROSS SECTION AND MANUFACTURING PROCESS THEREOF

(71) Applicant: Guangrong Lin, Guangdong (CN)

(72) Inventor: Guangrong Lin, Guangdong (CN)

( * ) Notice: Subject to any disclaimer, the term of this patent is extended or adjusted under 35 U.S.C. 154(b) by 0 days.

(21) Appl. No.: 15/122,179

(22) PCT Filed: Mar. 20, 2015

(86) PCT No.: PCT/CN2015/074685
§ 371 (c)(1),
(2) Date: Aug. 28, 2016

(87) PCT Pub. No.: WO2015/149631
PCT Pub. Date: Oct. 8, 2015

(65) Prior Publication Data
US 2016/0366941 A1    Dec. 22, 2016

(30) Foreign Application Priority Data

Apr. 2, 2014    (CN) .......................... 2014 1 0130532

(51) Int. Cl.
| A24F 47/00 | (2006.01) |
| A24F 7/00 | (2006.01) |
| B29C 70/76 | (2006.01) |
| F16B 21/06 | (2006.01) |
| B29L 31/00 | (2006.01) |

(52) U.S. Cl.
CPC .............. *A24F 47/008* (2013.01); *A24F 7/00* (2013.01); *B29C 70/766* (2013.01); *F16B 21/06* (2013.01); *B29L 2031/7414* (2013.01)

(58) Field of Classification Search
CPC ....... A24F 47/008; A24F 47/002; A24F 47/00
See application file for complete search history.

(56) References Cited

U.S. PATENT DOCUMENTS

| 9,510,623 B2 * | 12/2016 | Tucker | ................... | H01C 17/00 |
| 2014/0182608 A1 * | 7/2014 | Egoyants | .............. | A24F 47/008 |
| | | | | 131/328 |

(Continued)

FOREIGN PATENT DOCUMENTS

| CN | 202635604 U | 1/2013 |
| CN | 203789158 U | 8/2014 |

OTHER PUBLICATIONS

International Search Report of PCT Patent Application No. PCT/CN2015/014685 dated Jun. 15, 2015.

*Primary Examiner* — Gary Paumen

(57) ABSTRACT

The invention discloses an oval-shaped electronic cigarette and manufacturing process thereof. Inner housing of vaporization assembly is arranged inside outer housing of vaporization assembly and sleeved on vaporization assembly which comprises e-cigarette liquid cup and vaporizer having an outer wall in close fit with inner wall of the inner housing of vaporization assembly. A space is formed between outer wall of the e-cigarette liquid cup and inner wall of the inner housing of vaporization assembly to serve as a vapor flow channel. The inner housing of vaporization assembly is arranged at one end with vapor flow outlet, the outer edge of which is hermetically connected with and pressed against bell-mouth structure formed on the mouthpiece.

6 Claims, 3 Drawing Sheets

(56) References Cited

U.S. PATENT DOCUMENTS

| | | | |
|---|---|---|---|
| 2014/0374289 A1* | 12/2014 | Liu | A24F 15/12 |
| | | | 206/268 |
| 2015/0181928 A1* | 7/2015 | Liu | A24F 47/008 |
| | | | 131/329 |
| 2015/0201674 A1* | 7/2015 | Dooly | B65B 5/06 |
| | | | 53/432 |
| 2016/0192707 A1* | 7/2016 | Li | H05B 3/00 |
| | | | 131/329 |
| 2016/0302487 A1* | 10/2016 | Chen | A24F 47/00 |

* cited by examiner

ELECTRONIC CIGARETTE WITH OVAL SHAPED CROSS SECTION AND MANUFACTURING PROCESS THEREOF

FIELD OF THE INVENTION

The present invention relates to an electronic cigarette with oval shaped cross section and manufacturing process thereof.

BACKGROUND OF THE INVENTION

Chinese patent application No. 201220287142.7 discloses an oval electronic cigarette, aiming to provide an electronic cigarette with a mouthpiece of vaporizer, a copper part and a vaporization rod all can be demounted, and therefore the oval electronic cigarette is convenient to carry and replace. The technical solution is as below. The oval electronic cigarette is composed of a battery portion, an oil storage portion, a vaporization portion and a mouthpiece portion, wherein an oval battery is arranged in the battery portion, the oil storage portion comprises a transparent casing, the vaporization portion comprises a vaporizer arranged in the oil storage portion, and the mouthpiece portion comprises a plastic mouthpiece according with the food level standard and is arranged at the top end of the electronic cigarette. The oval electronic cigarette has disadvantages as follows. Since the vaporizer of the oval electronic cigarette is arranged inside the oil storage portion at the proximal end of the mouthpiece, the gas vaporized under high temperature may directly get to smoker's mouth and consequently the risk of mouth burning is high. In addition, after vaporization, the vapor flow channel is too short, so that impurities and steam cannot be completely separated and will lead to undesired taste. Moreover, the vaporizer, the copper part and the vaporization rod need to be demounted many times and it is not convenient for the user to use.

SUMMARY OF THE INVENTION

Technical Problems

The present invention aims to provide an electronic cigarette with oval shaped cross section, comprising an outer housing of control assembly and an outer housing of vaporization assembly which are axially matched with each other and can be connected in a sleeve type by snap joint of protrusion portions, thereby can achieve quick connection and position in relation to each other. The present invention further aims to provide an electronic cigarette with oval shaped cross section, which comprises a mouthpiece having a bell-mouth structure hermetically connected with an outer edge of vapor flow outlet of the vaporization assembly in a manner of being pressed against each other. The present invention further aims to provide an electronic cigarette with oval shaped cross section, which comprises a long vapor flow channel due to the vaporizer being far away from the mouthpiece and thus facilitates the separation of impurities and steam. The present invention further aims to provide a manufacturing process of an electronic cigarette with oval shaped cross section.

Technical Solutions

The present invention provides an electronic cigarette with oval shaped cross section, comprising a battery assembly and an outer housing of battery assembly with an oval shaped cross section, a control assembly and an outer housing of control assembly with an oval shaped cross section, a vaporization assembly and an outer housing of vaporization assembly with an oval shaped cross section, and a mouthpiece with an oval shaped cross section. It has features as follows.

An inner housing of vaporization assembly is arranged inside the outer housing of vaporization assembly and is sleeved on the vaporization assembly. The vaporization assembly comprises a vaporizer, which has an inner wall in close fit with an outer wall of the inner housing of vaporization assembly, and an e-cigarette liquid cup which has an inner wall such that a space is formed between the inner wall of the e-cigarette liquid cup and the outer wall of the inner housing of vaporization assembly to form a vapor flow channel.

The inner housing of vaporization assembly is arranged with a vapor flow outlet at one end. The outer edge of the vapor flow outlet is hermetically connected with a bell-mouth structure, which is formed on the mouthpiece and is made of soft material, in a manner of being pressed against each other.

The inlet opening formed on the outer housing of vaporization assembly, the air inlet arranged on the vaporization assembly at the end where the vaporization assembly is connected with the control assembly, the vapor flow vent hole formed on outer wall of the joint between e-cigarette liquid cup and vaporizer, the vapor flow channel formed by the space between inner housing of vaporization assembly and outer wall of e-cigarette liquid cup, the vapor flow outlet, and a channel inside the mouthpiece, together constitute a continuous vapor flow pathway.

Preferably, the outer housing of vaporization assembly and the outer housing of control assembly are tightly connected in a sleeve type, in order to make sure that the bell-mouth structure and the vapor flow outlet can be tightly pressed against each other and can be hermetically connected.

Preferably, the vaporizer is electrically connected with the control assembly by screw thread.

Preferably, the tight connection of the sleeve type is a connection that, a protrusion portion arranged on the inner wall of the outer housing of vaporization assembly and a protrusion portion arranged on the outer wall of the outer housing of control assembly are axially matched with each other and are connected by snap joint.

Preferably, the tight connection of the sleeve type is a connection that, the protrusion portion arranged on the inner wall of the outer housing of vaporization assembly and the protrusion portion arranged on the outer wall of the outer housing of control assembly are radially matched with each other and are connected by rotary joint.

Preferably, the outer housing of vaporization assembly is tapering from the proximal end of the control assembly to the end where the mouthpiece is arranged.

The present invention also provides a manufacturing process of an electronic cigarette with oval shaped cross section. It comprises steps as follows.

(1) Assembling a control assembly:
(1.1) installing a control panel into a support arranged inside the control assembly;
(1.2) mounting a mounting part for the control panel;
(1.3) connecting output positive and negative electrodes with output terminal of the control panel.

(2) Assembling a battery assembly:
(2.1) connecting the control assembly with positive and negative electrodes of the battery;

(2.2) installing a battery into an outer housing of battery assembly;
(2.3) installing an end cap.
(3) Assembling a vaporization assembly:
(3.1) assembling a vaporizer;
(3.2) assembling an e-cigarette liquid cup;
(3.3) assembling the e-cigarette liquid cup and the vaporizer to form the vaporization assembly;
(3.4) installing the assembled vaporization assembly into an inner housing of vaporization assembly.
(4) Assembling a mouthpiece and an outer housing of vaporization assembly:
(4.1) moulding the outer housing of vaporization assembly and the mouthpiece which are made of different materials by secondary forming process or by two-color molding method.
(5) Finally assembling:
(5.1) after connecting the outer housing of battery assembly and the outer housing of control assembly in a sleeve type, moulding them in close fit with each other by ultrasonic method;
(5.2) connecting the outer housing of vaporization assembly mounted with the mouthpiece with the outer housing of control assembly in an axial sleeve type, connecting the protrusion portions which are formed on respective sleeve part and are matched with each other by snap joint to form a tight connection.

Advantages

With the oval shaped configuration, the electronic cigarette with oval shaped cross section has a beautiful outline. Since it comprises a vaporizer which is far away from the mouthpiece, the longer vapor flow channel can facilitate the separation of impurities and steam, avoid burning smoker's mouth, and improve the taste. In addition, since the outer housing of vaporization assembly and the outer housing of control assembly are connected in a sleeve type by snap joint of protrusion portions, it not only ensures a tight fit, but also is convenient to assemble and disassemble. Furthermore, the vaporization assembly can be replaced by one, it is convenient to assemble, saving materials and lowering the cost. Moreover, the inner housing of vaporization assembly may be separated from the vaporization assembly, and consequently it is convenient to clean it.

Figure 1:
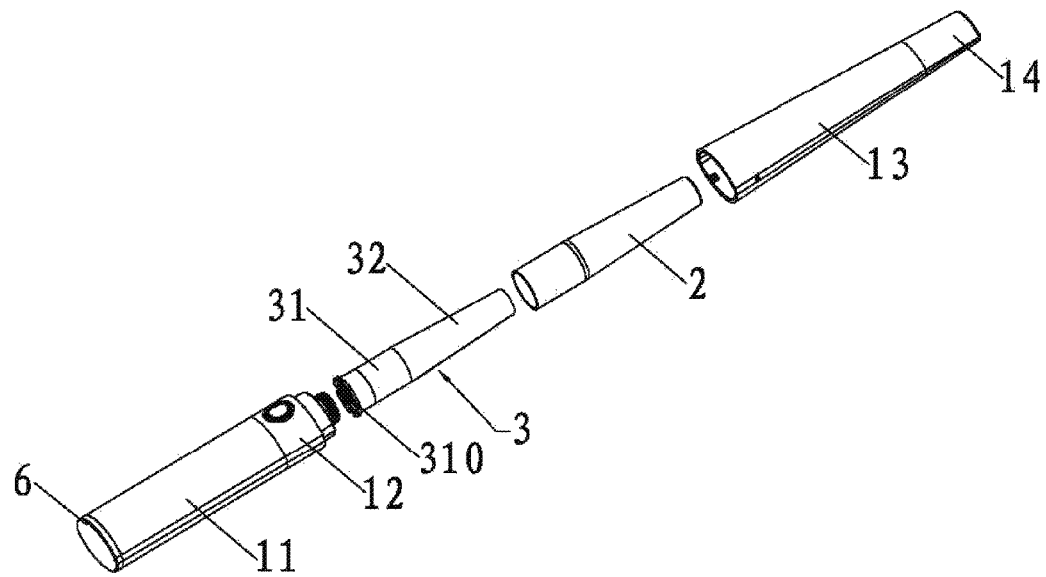
FIG. 1 is an exploded view of an electronic cigarette with oval shaped cross section according to the present invention.

LIST OF REFERENCE NUMERALS OF MAIN COMPONENTS 11 outer housing of battery assembly
12 outer housing of control assembly
121 protrusion portion
13 outer housing of vaporization assembly
131 inlet opening
132 protrusion portion
14 mouthpiece
141 bell-mouth structure
2 inner housing of vaporization assembly
21 vapor flow outlet
3 vaporization assembly
31 vaporizer
310 air inlet
311 vapor flow vent hole
32 e-cigarette liquid cup
4 vapor flow channel
5 control assembly
6 end cap

DETAILED DESCRIPTION OF ILLUSTRATED EMBODIMENTS

The present invention will be further explained below in conjunction with figures.

Referring to FIG. 1, an electronic cigarette with oval shaped cross section comprises a battery assembly and an outer housing 11 of battery assembly which has an oval shaped cross section, a control assembly 5 and an outer housing 12 of control assembly which has an oval shaped cross section, a vaporization assembly and an outer housing 13 of vaporization assembly which has an oval shaped cross section, and a mouthpiece 14 which has an oval shaped cross section. The vaporizer 31 is electrically connected with the control assembly 5 by screw thread.

Figure 4:
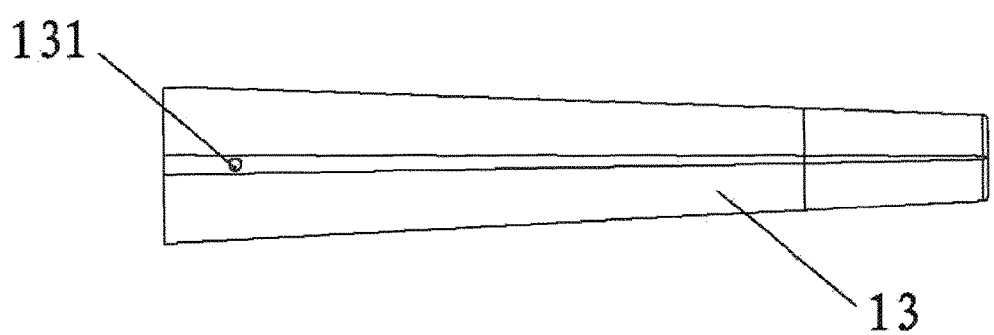
FIG. 4 is a schematic drawing of an electronic cigarette which has a housing formed with an inlet opening according to the present invention.
Figure 5:
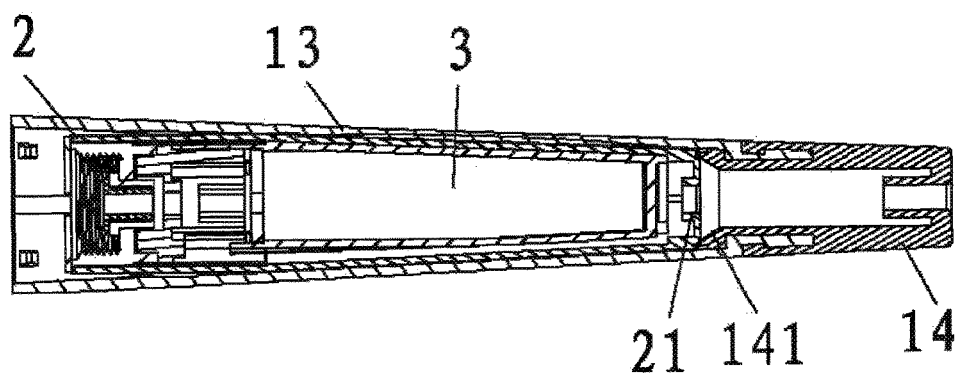
FIG. 5 is a schematic drawing of an electronic cigarette illustrating a bell-mouth structure of a mouthpiece matching with a vapor flow outlet of a vaporizer according to the present invention.

Referring to FIGS. 1 and 4, the outer housing 13 of vaporization assembly is formed with an inlet opening 131, and the vaporization assembly 3 is arranged with an air inlet 310 at an end where it is connected with the control assembly 5. A vapor flow vent hole 311 is formed on outer wall of the joint between e-cigarette liquid cup 32 and vaporizer 31. A vapor flow channel 4 is formed by the space between inner housing 2 of vaporization assembly and outer wall of e-cigarette liquid cup 32. The inlet opening 131, the air inlet 310, the vapor flow vent hole 311, the vapor flow channel 4, vapor flow outlet 21, and a channel inside the mouthpiece 14, together constitute a continuous vapor flow pathway. The inner housing 2 of vaporization assembly is arranged inside the outer housing 13 of vaporization assembly and is sleeved on the vaporization assembly 3. The vaporization assembly 3 comprises a vaporizer 31 and an e-cigarette liquid cup 32, wherein the vaporizer 31 is in close fit with the inner housing 2 of vaporization assembly while the e-cigarette liquid cup 32 and the inner housing 2 of vaporization assembly are arranged in a manner such that a space is formed therebetween to serve as the vapor flow channel 4. The outer housing 13 of vaporization assembly has a structure tapering from the proximal end of the control assembly 5 to the end where the mouthpiece is arranged.

Figure 7:
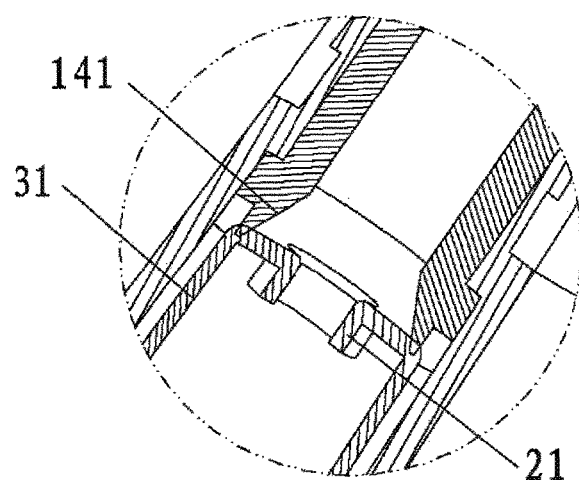
FIG. 7 is a partial enlarged view of the structure as shown in FIG. 6.

Referring to FIG. 7, the inner housing 2 of vaporization assembly is arranged with a vapor flow outlet 21 at one end. The outer edge of the vapor flow outlet 21 is hermetically connected with the bell-mouth structure 141, which is formed on the mouthpiece 14 and is made of soft material, in a manner of being pressed against each other.

Figure 6:
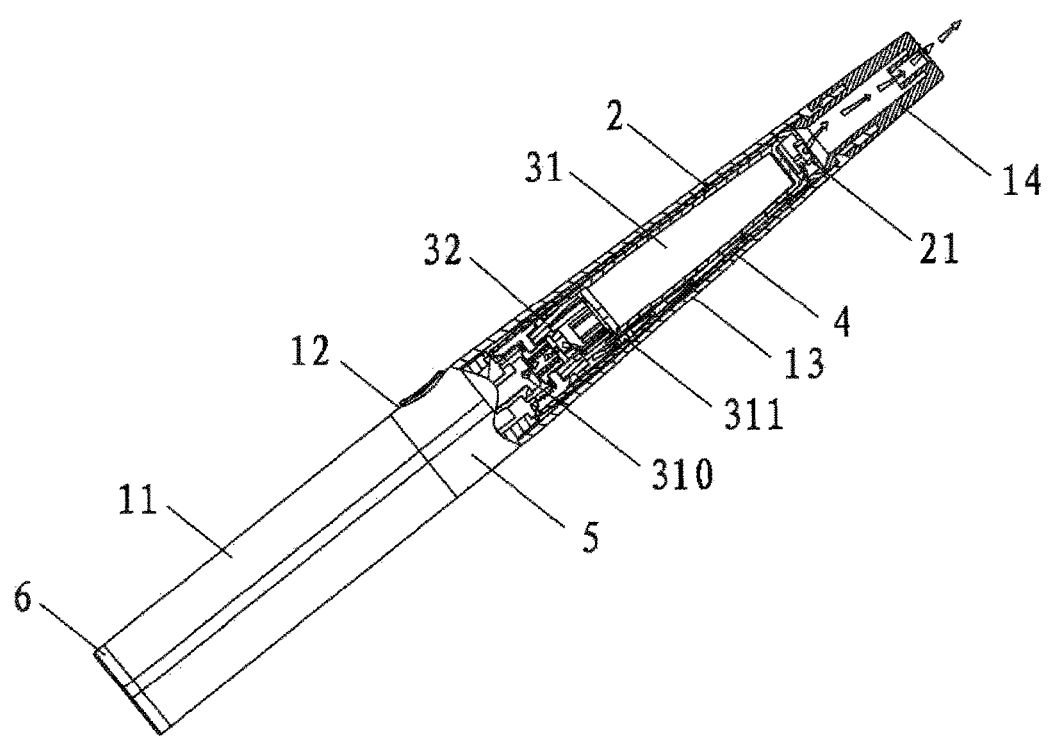
FIG. 6 is a schematic drawing of continuous vapor flow pathway of an electronic cigarette according to the present invention.

Referring to FIG. 6, the inlet opening 131 formed on the outer housing 13 of vaporization assembly, the air inlet 310 arranged on the vaporization assembly 3 at the end where the vaporization assembly 3 is connected with the control assembly 5, the vapor flow vent hole 311 formed on outer wall of the joint between e-cigarette liquid cup 32 and vaporizer 31, the vapor flow channel 4 formed by the space between inner housing 2 of vaporization assembly and outer wall of e-cigarette liquid cup 32, the vapor flow outlet 21, and the channel inside the mouthpiece, together constitute a continuous vapor flow pathway.

Figure 2:
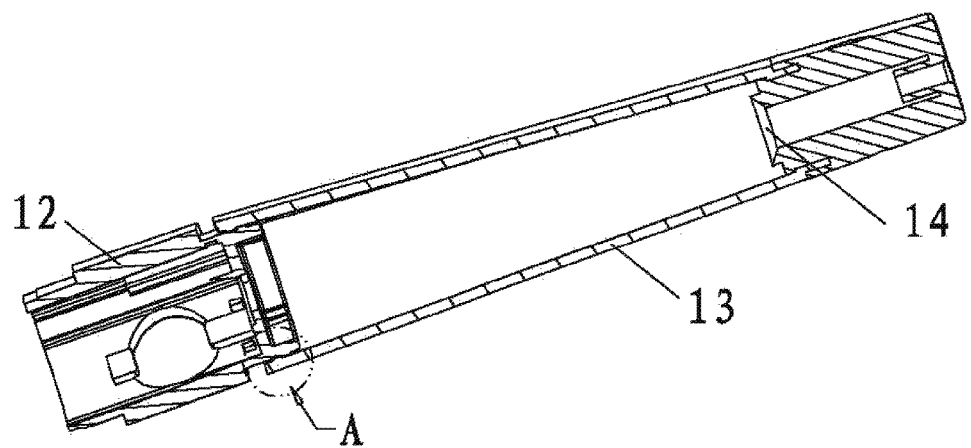
FIG. 2 is a partial sectional view of an electronic cigarette with oval shaped cross section according to the present invention.
Figure 3:
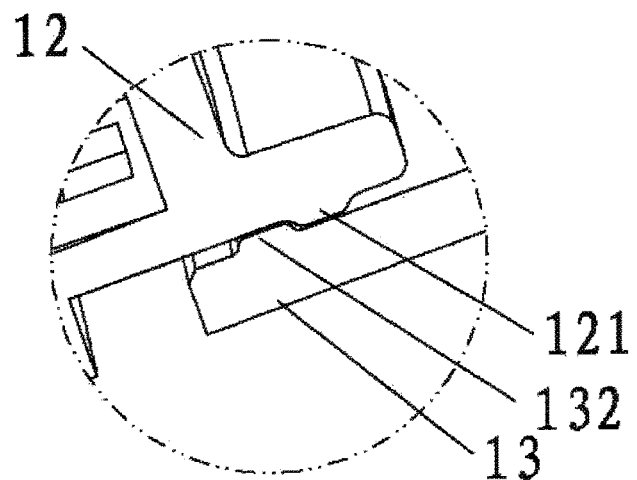
FIG. 3 is a partial enlarged view of the structure as shown in FIG. 2.

Referring to FIGS. 2, 3 and 6, the outer housing 13 of vaporization assembly and the outer housing 12 of control assembly are tightly connected in a sleeve type, in order to make sure that the bell-mouth structure 141 and the vapor flow outlet 21 can be tightly pressed against each other and can be hermetically connected.

Referring to FIG. 3, the outer housing 13 of vaporization assembly and the outer housing 12 of control assembly are tightly connected in a sleeve type that, a protrusion portion 132, which is arranged on the inner wall of the outer housing 13 of vaporization assembly, and a protrusion portion 121, which is arranged on the outer wall of the outer housing 12 of control assembly, are connected by axial snap joint.

In an optional manner, the outer housing 13 of vaporization assembly and the outer housing 12 of control assembly are tightly connected in a sleeve type that, the protrusion portion 132, which is arranged on the inner wall of the outer housing 13 of vaporization assembly, and the protrusion portion 121, which is arranged on the outer wall of the outer housing 12 of control assembly, are connected by radial rotary joint.

Referring to the FIGS. 1-7, manufacturing process of an electronic cigarette with oval shaped cross section comprises steps as follows:

(1) Assembling a control assembly 5:
(1.1) installing a control panel into a support (not shown in figures) arranged inside the control assembly 5;
(1.2) mounting a mounting part (not shown in figures) for the control panel;
(1.3) connecting output positive and negative electrodes with output terminal of the control panel.
(2) Assembling a battery assembly:
(2.1) connecting the control assembly 5 with positive and negative electrodes of the battery;
(2.2) installing a battery into an outer housing 11 of battery assembly;
(2.3) installing an end cap 6.
(3) Assembling a vaporization assembly 13:
(3.1) assembling a vaporizer 31;
(3.2) assembling an e-cigarette liquid cup 32;
(3.3) assembling the e-cigarette liquid cup 32 and the vaporizer 31 to form the vaporization assembly 3;
(3.4) installing the assembled vaporization assembly 3 into an inner housing 2 of vaporization assembly;
(3.4) installing the assembled e-cigarette liquid cup 32 and vaporizer 31 to form the inner housing 2 of vaporization assembly.
(4) Assembling a mouthpiece 14 and an outer housing 13 of vaporization assembly:
(4.1) moulding the mouthpiece 14 and the outer housing 13 of vaporization assembly which are made of different materials by secondary forming process or by two-color molding method.
(5) Finally assembling:
(5.1) after connecting the outer housing 11 of battery assembly and the outer housing 12 of control assembly in a sleeve type, moulding them in close fit with each other by ultrasonic method;
(5.2) connecting the outer housing 13 of vaporization assembly mounted with the mouthpiece 14 with the outer housing 12 of control assembly in an axial sleeve type, connecting the protrusion portion 121 and the protrusion portion 132 which are formed on respective sleeve part and are matched with each other by snap joint to form a tight connection.

All the above are merely the preferred embodiments of the present invention. The present invention is intended to cover various modifications and equivalent arrangements included within the principle and scope of the present invention.

What is claimed is:

1. An electronic cigarette with oval shaped cross section, comprising a battery assembly and an outer housing of battery assembly with an oval shaped cross section, a control assembly and an outer housing of control assembly with an oval shaped cross section, a vaporization assembly and an outer housing of vaporization assembly with an oval shaped cross section, and a mouthpiece with an oval shaped cross section, characterized in that:
   an inner housing of vaporization assembly is arranged inside the outer housing of vaporization assembly and is sleeved on the vaporization assembly, wherein the vaporization assembly comprises a vaporizer and an e-cigarette liquid cup, wherein an outer wall of the vaporizer is in close fit with an inner wall of the inner housing of vaporization assembly, and a space is formed between an outer wall of the e-cigarette liquid cup and the inner wall of the inner housing of vaporization assembly to serve as a vapor flow channel;
   the inner housing of vaporization assembly is arranged with a vapor flow outlet at one end, the outer edge of the vapor flow outlet is hermetically connected with a bell-mouth structure, which is formed on the mouthpiece and is made of soft material, in a manner of being pressed against each other;
   an inlet opening formed on the outer housing of vaporization assembly, an air inlet arranged on the vaporization assembly at an end where the vaporization assembly is connected with the control assembly, a vapor flow vent hole formed on outer wall of the joint between the e-cigarette liquid cup and the vaporizer, the vapor flow channel formed by the space between inner housing of vaporization assembly and outer wall of e-cigarette liquid cup, a vapor flow outlet, and a channel inside the mouthpiece, together constitute a continuous vapor flow pathway; and
   the outer housing of vaporization assembly and the outer housing of control assembly are tightly connected in a sleeve type, in order to make sure that the bell-mouth structure and outer edge of the vapor flow outlet can be tightly pressed against each other and can be hermetically connected.

2. The electronic cigarette with oval shaped cross section according to claim 1, characterized in that: the vaporizer is electrically connected with the control assembly by screw thread.

3. The electronic cigarette with oval shaped cross section according to claim 1, characterized in that: the tight connection of the sleeve type is a connection that, a protrusion portion arranged on the inner wall of the outer housing of vaporization assembly and a protrusion portion arranged on the outer wall of the outer housing of control assembly are axially matched with each other and are connected by snap joint.

4. The electronic cigarette with oval shaped cross section according to claim 1, characterized in that: the tight connection of the sleeve type is a connection that, the protrusion portion arranged on the inner wall of the outer housing of vaporization assembly and the protrusion portion arranged on the outer wall of the outer housing of control assembly are radially matched with each other and are connected by rotary joint.

5. The electronic cigarette with oval shaped cross section according to claim 1, characterized in that: the outer housing of vaporization assembly is tapering from the proximal end of the control assembly to the end where the mouthpiece is arranged.

6. A manufacturing process of an electronic cigarette with oval shaped cross section, characterized in that it comprises steps as follows:
(1) assembling a control assembly:
 (1.1) installing a control panel into a support arranged inside the control assembly;
 (1.2) mounting a mounting part for the control panel; and
 (1.3) connecting output positive and negative electrodes with output terminal of the control panel;
(2) assembling a battery assembly:
 (2.1) connecting the control assembly with positive and negative electrodes of the battery;
 (2.2) installing a battery into an outer housing of battery assembly; and
 (2.3) installing an end cap;
(3) assembling a vaporization assembly:
 (3.1) assembling a vaporizer;
 (3.2) assembling an e-cigarette liquid cup;
 (3.3) assembling the e-cigarette liquid cup and the vaporizer to form the vaporization assembly; and
 (3.4) installing the assembled vaporization assembly into an inner housing of the vaporization assembly;
(4) assembling a mouthpiece and an outer housing of the vaporization assembly:
 (4.1) moulding the outer housing of vaporization assembly and the mouthpiece which are made of different materials by secondary forming process or by two-color molding method; and
(5) finally assembling:
 (5.1) after connecting the outer housing of battery assembly and the outer housing of control assembly in a sleeve type, moulding them in close fit with each other by ultrasonic method; and
 (5.2) connecting the outer housing of the vaporization assembly mounted with the mouthpiece with the outer housing of the control assembly in an axial sleeve type, connecting the protrusion portions which are formed on respective sleeve parts and are matched with each other by a snap joint to form a tight connection.

\* \* \* \* \*